US011604928B2

(12) United States Patent
James et al.

(10) Patent No.: US 11,604,928 B2
(45) Date of Patent: Mar. 14, 2023

(54) EFFICIENTLY MANAGING PREDICTIVE CHANGES FOR A CONVERSATIONAL AGENT

(71) Applicant: INTERNATIONAL BUSINESS MACHINES CORPORATION, Armonk, NY (US)

(72) Inventors: Rebecca R. James, Cary, NC (US); Lalit Agarwalla, Bangalore (IN); Shane M. Kilmon, Tyngsborough, MA (US); Andrew R. Freed, Cary, NC (US); Leo Mazzoli, Hilliard, OH (US)

(73) Assignee: International Business Machines Corporation, Armonk, NY (US)

( * ) Notice: Subject to any disclaimer, the term of this patent is extended or adjusted under 35 U.S.C. 154(b) by 301 days.

(21) Appl. No.: 16/862,945

(22) Filed: Apr. 30, 2020

(65) Prior Publication Data

US 2021/0342542 A1 Nov. 4, 2021

(51) Int. Cl.
*G06F 40/30* (2020.01)
*G06N 5/02* (2023.01)

(52) U.S. Cl.
CPC ............ *G06F 40/30* (2020.01); *G06N 5/02* (2013.01)

(58) Field of Classification Search
CPC .... G06F 40/211; G06F 40/253; G06F 40/268; G06F 40/284; G06F 40/30; G06F 16/3344
See application file for complete search history.

(56) References Cited

U.S. PATENT DOCUMENTS

| 5,809,212 A | * | 9/1998 | Shasha | ...................... G06N 5/02 706/56 |
| 6,993,759 B2 | | 1/2006 | Aptus et al. | |
| 8,375,357 B2 | | 2/2013 | Austin et al. | |
| 8,630,961 B2 | | 1/2014 | Beilby et al. | |
| 8,887,126 B1 | | 11/2014 | Monteiro et al. | |

(Continued)

FOREIGN PATENT DOCUMENTS

| EP | 0807290 | 5/2000 |
| EP | 1680727 | 10/2003 |

OTHER PUBLICATIONS

Matthies et al., "An Additional Set of (Automated) Eyes: Chatbots for Agile Retrospectives", 2019 IEEE. https://www.researchgate.net publication/331562219_An_Additional_Set_of_Automated_Eyes_Chatbots_for_Agile_Retrospectives, 5 pages.

(Continued)

*Primary Examiner* — Lamont M Spooner
(74) *Attorney, Agent, or Firm* — Stephen R. Yoder (57) ABSTRACT

A dialog change service builds a directed graph of nodes, each described by code for a conversational agent stored in source control, the code comprising one or more dialog-based features. The dialog change service, responsive to receiving a request for a dialog change to a particular node of the conversational agent, evaluates the directed graph to identify an additional selection of nodes that require a similar changes as the dialog change based on textual and structural content. The dialog change service updates the code for the particular node and the additional selection of nodes to propagate the dialog change in the conversational agent stored in source control.

17 Claims, 7 Drawing Sheets

(56) References Cited

U.S. PATENT DOCUMENTS

| | | | |
|---|---|---|---|
| 9,116,975 B2 | 8/2015 | Shankar et al. | |
| 9,646,030 B2 | 5/2017 | Ohtake et al. | |
| 9,870,415 B2 | 1/2018 | Meyles et al. | |
| 10,565,509 B2* | 2/2020 | London | G10L 15/1822 |
| 10,817,578 B2* | 10/2020 | Mandal | G06F 16/3329 |
| 11,308,940 B2* | 4/2022 | Krishnamurthy | G10L 15/005 |
| 11,425,254 B2* | 8/2022 | Mazza | H04L 51/02 |
| 11,425,255 B2* | 8/2022 | Mazza | H04M 3/527 |
| 2001/0049688 A1* | 12/2001 | Fratkina | G06F 16/954 |
| 2004/0006743 A1* | 1/2004 | Oikawa | G06F 40/131 |
| | | | 709/219 |
| 2007/0168336 A1* | 7/2007 | Ransil | G06F 16/958 |
| 2008/0263443 A1* | 10/2008 | Maxime | G06F 40/166 |
| | | | 715/271 |
| 2009/0043867 A1* | 2/2009 | Sharp | G06F 16/27 |
| | | | 709/218 |
| 2009/0089313 A1* | 4/2009 | Cooper | G06F 16/217 |
| | | | 707/999.102 |
| 2010/0058118 A1* | 3/2010 | Yamaoka | G06F 9/451 |
| | | | 714/48 |
| 2011/0078411 A1* | 3/2011 | Maclinovsky | G06Q 10/06 |
| | | | 712/30 |
| 2013/0326349 A1* | 12/2013 | Mehalingam | G06F 40/166 |
| | | | 715/271 |
| 2015/0039287 A1* | 2/2015 | Han | G06F 40/58 |
| | | | 704/2 |
| 2016/0117593 A1* | 4/2016 | London | G06F 40/30 |
| | | | 706/11 |
| 2016/0188747 A1* | 6/2016 | Cypher | G06F 16/84 |
| | | | 707/756 |
| 2017/0046861 A1* | 2/2017 | Beckett | G06F 16/904 |
| 2018/0129739 A1* | 5/2018 | Jones | G06F 16/367 |
| 2018/0129754 A1* | 5/2018 | Jones | G06F 16/90335 |
| 2019/0102078 A1 | 4/2019 | Bhatt et al. | |
| 2019/0163694 A1 | 5/2019 | Yao | |
| 2019/0182382 A1* | 6/2019 | Mazza | H04L 51/02 |
| 2019/0188261 A1* | 6/2019 | Herzig | G06F 40/30 |
| 2019/0347326 A1* | 11/2019 | Kozhaya | G06F 40/30 |
| 2020/0012720 A1* | 1/2020 | Elson | G06N 5/003 |
| 2020/0193265 A1* | 6/2020 | Hill | G06N 3/0454 |
| 2020/0302112 A1* | 9/2020 | Helmbro | G10L 15/08 |

OTHER PUBLICATIONS

No author, "Dialog Overview, Watson Assistant", IBM, Mar. 5, 2020, accessed online from <https://cloud.ibm.com/docs/assistant?topic=assistant-dialog-overview>, 28 pages.

No author, "Graph rewriting", accessed online from <https://en.wikipedia.org/wiki/Graph_rewriting> as of Feb. 4, 2020, 6 pages.

No author, "Hotspots—CodeScene 1 Documentation", accessed online from <https://codescene.io/docs/guides/technical/hotspot.html> as of Feb. 4, 2020, 12 pages.

"Changing interrogative sentences into the passive", English Grammer, Mar. 24, 2015, 4 pages, <https://www.englishgrammar.org/changing-interrogative-sentences-passive/>.

Wikipedia, "List of tools for static code analysis", last edited on Apr. 13, 2022, 17 pages, <https://en.wikipedia.org/wiki/List_of_tools_for_static_code_analysis>.

* cited by examiner

EXISTING CONVERSATIONAL AGENT 402

| NODE ID | NODE TEXT | RESPONSES ALLOWED | |
|---|---|---|---|
| 1 | WOULD YOU LIKE ME TO REPEAT THAT? | @YES, @NO | ⎯404 |
| 2 | WOULD YOU LIKE TO HEAR THAT AGAIN? | @YES, @NO | ⎯406 |
| 3 | DID YOU SAY $VALUE? | @YES, @NO | ⎯408 |
| 4 | RATE MY PERFORMANCE ON A SCALE OF 1 TO 5 | @NUMERIC_RATING | ⎯410 |

DIALOG CHANGE 420

NODE ID [1],
NODE TEXT, CHANGE [YES OR NO, WOULD YOU LIKE ME TO REPEAT THAT?]

PROPOSED CHANGE SUMMARY 330

| NODE ID | NODE TEXT | RESPONSES ALLOWED |
|---|---|---|
| 1 | YES OR NO, WOULD YOU LIKE ME TO REPEAT THAT? | @YES, @NO |
| 2 | YES OR NO, WOULD YOU LIKE TO HEAR THAT AGAIN? | @YES, @NO |
| 3 | YES OR NO, DID YOU SAY $VALUE? | @YES, @NO |
| 4 | RATE MY PERFORMANCE ON A SCALE OF 1 TO 5 | @NUMERIC_RATING |

*FIG. 4*

EXISTING CHATBOT 502

| ID | NODE TEXT | RESPONSES ALLOWED | DIALOG NODE CONTEXT VARIABLES AND VALUE |
|---|---|---|---|
| 1 | MAY I HAVE THE DATE OF SERVICE? | @DATE / @YES,@NO | VARIABLE : CONFIG<br>VALUE : {"CUSTOM_ID": "$DOS_MODEL", "MAX_A":2, ⌐504<br>"ACOUSTIC_CUSTOM_ID": "$DATE_ACOUSTIC_MODEL"} |
| 2 | WHAT'S THE DATE OF SERVICE? | @DATE / @YES, @NO | VARIABLE : CONFIG<br>VALUE : {"CUSTOM_ID": "$DOS_MODEL", "MAX_A":2, ⌐506<br>"ACOUSTIC_CUSTOM_ID": "$DATE_ACOUSTIC_MODEL"} |
| 3 | MAY I HAVE THE DATE OF BIRTH? | @DATE / @YES, @NO | VARIABLE : CONFIG<br>VALUE : {"CUSTOM_ID": "$DOB_MODEL", "MAX_A":2, ⌐508<br>"ACOUSTIC_CUSTOM_ID": "$DATE_ACOUSTIC_MODEL"} |
| 4 | I DID NOT UNDERSTAND, PLEASE REPEAT THAT? | @DATE / @YES, @NO | VARIABLE : CONFIG<br>VALUE : {"CUSTOM_ID": "$RETRY_1_MODEL", "MAX_A":2, ⌐510<br>"ACOUSTIC_CUSTOM_ID": "$DATE_ACOUSTIC_MODEL"} |
| 5 | HOW MANY TIMES HAVE YOU CALLED US BEFORE? | @NUMBER | VARIABLE : CONFIG<br>VALUE : {"CUSTOM_ID": "$INTEGER_MODEL", "MAX_A":2, ⌐512<br>"ACOUSTIC_CUSTOM_ID": "$INTEGER_ACOUSTIC_MODEL"} |

DIALOG CHANGE 520

VARIABLE : CONFIG
VALUE : {"CUSTOM_ID": "$DATE_OPT_MODEL", "MAX_A":2,
"ACOUSTIC_CUSTOM_ID": "$DATE_ACOUSTIC_MODEL"}

PROPOSED CHANGE SUMMARY 530

| ID | NODE TEXT | RESPONSES ALLOWED | DIALOG NODE CONTEXT VARIABLES AND VALUE |
|---|---|---|---|
| 1 | MAY I HAVE THE DATE OF SERVICE? | @DATE / @YES,@NO | VARIABLE : CONFIG  ⌐532<br>VALUE : {"CUSTOM_ID": "$DATE_OPT_MODEL", "MAX_A":2,<br>"ACOUSTIC_CUSTOM_ID": "$DATE_ACOUSTIC_MODEL"} |
| 2 | WHAT'S THE DATE OF SERVICE? | @DATE / @YES, @NO | VARIABLE : CONFIG  ⌐534<br>VALUE : {"CUSTOM_ID": "$DATE_OPT_MODEL", "MAX_A":2,<br>"ACOUSTIC_CUSTOM_ID": "$DATE_ACOUSTIC_MODEL"} |
| 3 | MAY I HAVE THE DATE OF BIRTH? | @DATE / @YES, @NO | VARIABLE : CONFIG  ⌐536<br>VALUE : {"CUSTOM_ID": "$DATE_OPT_MODEL", "MAX_A":2,<br>"ACOUSTIC_CUSTOM_ID": "$DATE_ACOUSTIC_MODEL"} |
| 4 | I DID NOT UNDERSTAND, PLEASE REPEAT THAT? | @DATE / @YES, @NO | VARIABLE : CONFIG  ⌐538<br>VALUE : {"CUSTOM_ID": "$DATE_OPT_MODEL", "MAX_A":2,<br>"ACOUSTIC_CUSTOM_ID": "$DATE_ACOUSTIC_MODEL"} |
| 5 | HOW MANY TIMES HAVE YOU CALLED US BEFORE? | @NUMBER | VARIABLE : CONFIG<br>VALUE : {"CUSTOM_ID": "$INTEGER_MODEL", "MAX_A":2,<br>"ACOUSTIC_CUSTOM_ID": "$INTEGER_ACOUSTIC_MODEL"} |

FIG. 7

EFFICIENTLY MANAGING PREDICTIVE CHANGES FOR A CONVERSATIONAL AGENT

BACKGROUND

1. Technical Field

One or more embodiments of the invention relate generally to data processing and particularly to efficiently managing predictive changes for a conversational agent.

2. Description of the Related Art

Natural language processing (NLP) refers to a technique that supports applications that facilitate human interaction in a natural language dialog with machines. Many web services incorporate automated conversational agent services, such as a chatbot, that automate interactions with users using NLP through classifying user inputs and selecting outputs based on classifications.

BRIEF SUMMARY

In one embodiment, a method is directed to, building, by a computer, a directed graph of a plurality of nodes each described by code for a conversational agent, the code comprising one or more dialog-based features. The method is directed to, responsive to receiving a request for a dialog change to a particular node from among the plurality of nodes of the conversational agent, evaluating, by the computer, the directed graph to identify an additional selection of nodes from among the plurality of nodes that require a similar changes as the dialog change based on textual and structural content. The method is directed to updating, by the computer, the code for the particular node and the additional selection of nodes to propagate the dialog change in the conversational agent.

In another embodiment, a computer system comprises one or more processors, one or more computer-readable memories, one or more computer-readable storage devices, and program instructions, stored on at least one of the one or more storage devices for execution by at least one of the one or more processors via at least one of the one or more memories. The stored program instructions comprise program instructions to build a directed graph of a plurality of nodes each described by code for a conversational agent, the code comprising one or more dialog-based features. The stored program instructions comprise program instructions, responsive to receiving a request for a dialog change to a particular node from among the plurality of nodes of the conversational agent, to evaluate the directed graph to identify an additional selection of nodes from among the plurality of nodes that require a similar changes as the dialog change based on textual and structural content. The stored program instructions comprise program instructions to update the code for the particular node and the additional selection of nodes to propagate the dialog change in the conversational agent.

In another embodiment, a computer program product comprises a computer readable storage medium having program instructions embodied therewith, wherein the computer readable storage medium is not a transitory signal per se. The program instructions executable by a computer to cause the computer to, build, by a computer, a directed graph of a plurality of nodes each described by code for a conversational agent, the code comprising one or more dialog-based features. The program instructions executable by a computer to cause the computer to, responsive to receiving a request for a dialog change to a particular node from among the plurality of nodes of the conversational agent, evaluate, by the computer, the directed graph to identify an additional selection of nodes from among the plurality of nodes that require a similar changes as the dialog change based on textual and structural content. The program instructions executable by a computer to cause the computer to update, by the computer, the code for the particular node and the additional selection of nodes to propagate the dialog change in the conversational agent.

BRIEF DESCRIPTION OF THE SEVERAL VIEWS OF THE DRAWINGS

The novel features believed characteristic of one or more embodiments of the invention are set forth in the appended claims. The one or more embodiments of the invention itself however, will best be understood by reference to the following detailed description of an illustrative embodiment when read in conjunction with the accompanying drawings, wherein:

FIG. 5 illustrates one example of a block diagram of a predictive change response by a change controller for a source control to maintain context variable consistency in response to a request for a structural dialog change in a conversational system;

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In addition, in the following description, for purposes of explanation, numerous systems are described. It is important to note, and it will be apparent to one skilled in the art, that the present invention may execute in a variety of systems, including a variety of computer systems and electronic devices operating any number of different types of operating systems.

Figure 1:
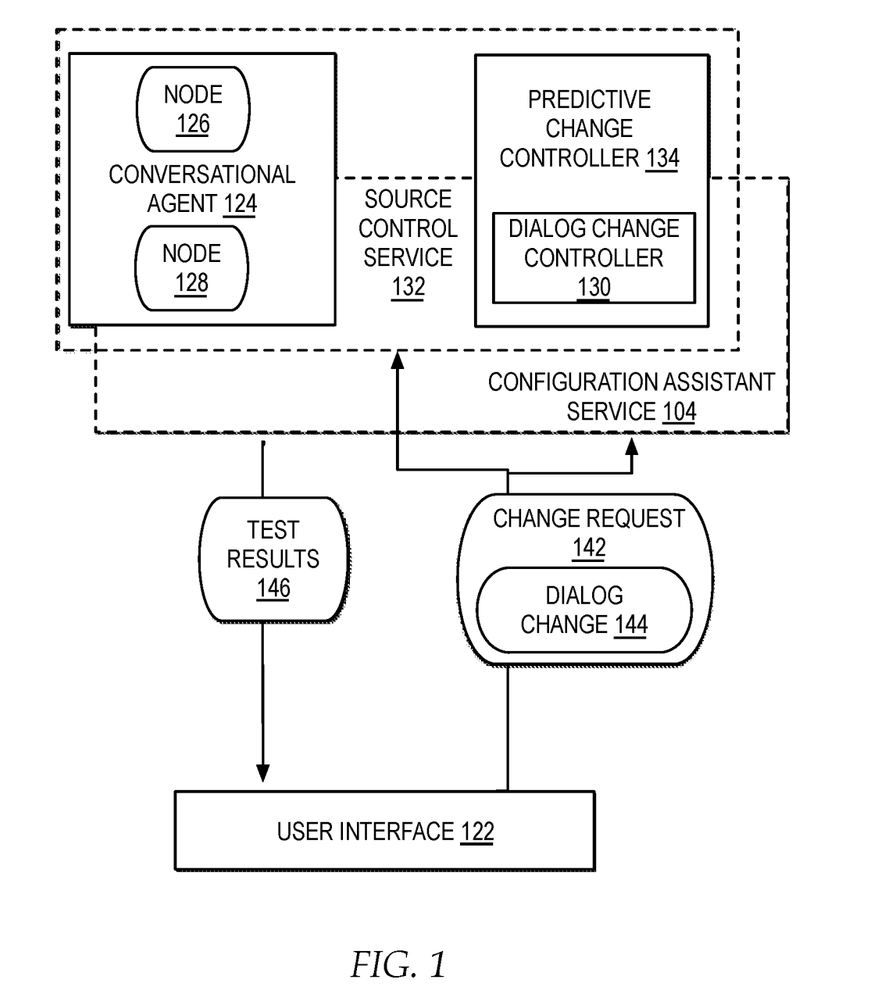
FIG. 1 illustrates one example of a block diagram of a source control service for efficiently managing predictive changes in response to a request for a dialog change in a conversational agent.

FIG. 1 illustrates one example of a block diagram of a source control service for efficiently managing predictive changes in response to a request for a dialog change in a conversational agent.

In one example, a conversational agent 124 represents an instance of a natural language processing (NLP) based dialog service or conversational system that performs natural language processing of user inputs and automatically responds, in a conversational dialog. In one example, conversational agent 124 represents a chatbot or other type of cognitive computing service that supports responding to natural language inputs through NLP techniques that facilitate the exchange of information with users who submit messages in a natural language. For example, a user may submit a message input of a string of text in a natural language input to a deployed conversational agent 124 and receive a message output automatically generated by conversational agent 124, in a natural, human language. In one example, web services may integrate conversational agent 124 to support an interface that provides automated responses to users, such as, but not limited to, a customer service interface. In one example, a user submitting messages to conversational agent 124 includes one or more of a human and an automated user.

In one example, machine learning plays a central role in artificial intelligence-based applications that interact with conversational agent 124. One of the primary outcomes of the process of creating and training a machine learning environment is a data object, referred to as a model, built from sample inputs. In one example, the one or more models in conversational agent 124 each represent a data object of a machine learning environment. A data object in a machine learning environment is enabled to support automated natural language processing and text classification analysis of volumes of text in a corpus of aspects and other information selected by a programmer that are so large, such as millions of words and phrases, that a person attempting to analyze the same volumes of text would require years of work to reach a same conclusion that machine learning based data objects are capable of performing in increments of a second or less, and likely with a greater accuracy than could be performed by a person having to process the same volume of information.

In one example, a developer initially configures conversational agent 124 through a configuration assistant service 104, such as a Watson Assistant (Watson is a registered trademark of International Business Machines Corporation). In one example, the developer may configure and submit changes to modify conversational agent 124 through a user interface 122 that is enabled for calling configuration assistance service 104. For example, user interface 122 supports a user submitting a change request 142 to configuration assistant service 104, to change a configuration of conversational agent 124.

In one example, the developer may also select to store conversational agent 124 with a source control service, such as source control service 132. In one example, source control service 132 facilitates maintenance of software projects, such as conversational agent 124, by one or more of providing a repository for a software project, tracking developer changes to the files in the software project, and managing commitment of edited files and other changes to the software project. For example, source control service 132 provides an interface for one or more developers to submit changes to conversational agent 124 from a software development interface, such as a change request 142 submitted via an instance of user interface 122 specified for directing source control service 132. In one example, a developer may work within an interface of an instance of user interface 122 to access files from source control service 132 and locally edit code within one or more accessed files. In another example, a developer may work within an instance of user interface 122 that supports an editing assistant or other type of interface that generates new files with additional or replacement code for conversational agent 124. In one example, multiple developers, accessing source control service 132 through multiple instances of user interface 122, may select to push the locally edited code to source control service 132 and request to commit the files to conversational agent 124. In one example, source control service 132 may perform one or more of managing tracking submitted changes in change request 142, reconciling commitments of changes submitted by one or more developers for a same file, requesting any supervisor approvals for updating the software project files, and managing any mergers of changes to a stored software project by one or more developers across one or more development interface updates to the stored software project.

In addition, source control service 132 facilitates maintenance of software projects stored in a software repository through a predictive change controller 134 that automatically evaluates and propagates change requests, such as change request 142, to change one portion of a software project submitted by a developer from development interface 122, across other portions of the software project, to maintain consistency. In one example, source control service 132 provides a service with predictive change controller 134 supporting source control maintenance of change requests for multiple types of software projects, including, but not limited to, dialog-based software projects with textual dialog specifications and function only software projects, without NLP textual dialog elements. In another example, source control service 132 provides a service with predictive change controller 134 supporting source control maintenance of change requests of dialog-based software projects.

According to an advantage of the present invention, to support consistency across dialog-based software projects, such as conversation agent 124, predictive change controller 134 implements a dialog change controller 130 specified to evaluate and propagate a dialog change 144 for conversational agent 124 within change request 142, to effectively provide a predictive change service for conversational systems. In particular, dialog change controller 130 is specified to evaluate and propagate conversation-specific textual changes in dialog change 144 that impact the consistency of dialog of dialog-based nodes in code of conversational agent 124, which may differ from other propagation functions supported by predictive change controller 134 for evaluating and propagating textual changes in change request 142 that impact the consistency of functional, non-dialog code of a software project managed by source control service 132. For example, predictive change controller 134 may support state, flow, and branching maintenance standards designed to evaluate and propagate textual changes in change request 142 to functional, non-dialog code managed by source control service 132, however, state, flow, and branching maintenance standards may not evaluate the full span and impact of a single dialog node code change by dialog change 144, which may spread across dialog strings described in code in multiple dialog nodes of conversational agent 124. By implementing dialog change controller 130 to handle dialog change 144 within change request 142, source control service 132 manages a reach across all dialog node code to evaluate and propagate changes to dialog-based nodes to maintain consistency among multiple dialog-based factors including, but not limited to, textual and grammatic structurer, voice, tone and expected responses.

In particular, in one example, the code for conversational agent 124 is configured in a structure supported by one or more dialog-based nodes, such as a node 126 and a node 128, each representing a selection of one or more features of a particular dialog response. For example, each node in conversational agent 124 may supported by one or more features to support NLP techniques for parsing and classifying natural language inputs and generating a conversation in response. A developer may configure one or more dialog nodes with one or more features for specifying how the NLP techniques are applied. In one example, node features may include, but are not limited to, defined entities, intents, and dialogs to specify the classification of inputs and select accurate outputs by one or more NLP classifiers and data models. In one example, the intents represent words, lists of words, and sentences that may be present in a user message input, to facilitate selection by conversational agent 124 of a response to the user message. In one example, entities represent a group of a word, object, and data type which have the same intent but different values, to provide context to an intent. In one example, dialog represents the textual responses to be produced by conversational agent 124 when a particular intent is detected, based on the context of that intent. In one example, within the configuration files for conversational agent 124, an intent may be designated using an "#" symbol, an entity type and entity value may be designated using an "@" symbol, and a context variable value may be designated using a "$" symbol.

In the example, while conversational agent 124 is illustrated with node 126 and node 128, in additional or alternate embodiments, conversational agent 124 may include a large volume of nodes organized from a root node, in one or more tree structures or other structures where parent and child nodes are designated. In one example, the code for each node is organized in a separate configuration file. In one example, the code for each node of conversational agent 124 includes at least a condition and a response. In one example, a condition specifies the information that if present in user input would trigger the dialog of the node and a response specifies the utterance or other output to place in a response to the user. In one example, nodes within conversational agent 124 may be configured in a tree of parent and child nodes, where in response to user input, conversational agent 124 traverses the tree from first node to last node, and within the first to last node, from parent node to child node.

Once conversational agent 124 is configured, a developer may need to perform maintenance of one or more aspects of the dialog returned by conversational agent 124, through dialog change 144, for one or more reasons including, but not limited to, correcting aspects that lead to an incorrect response to an input, changing the text of the dialog, requesting additional information in a response, and changing the types of information expected in a response. Dialog change controller 130 manages evaluation and propagation of predictive changes across all nodes of conversational agent 124 based on the specific changes requested to one or more nodes in dialog change 144. In particular, dialog change controller 130 manages analysis of textual and structural changes by dialog change 144 to the code for one or more dialog nodes within conversational agent 124 and efficiently determines impacts and required changes across the rest of the code for conversational agent 124 in response to specific changes requested in dialog change 144 for a single node.

Dialog change controller 130 also manages commitment of changes to conversational agent 124 and testing of updates to the code for conversational agent 124. In one example, dialog change controller 130 sends permission requests to development interface 122 for a developer to authorize the commitment of one or more proposed additional changes to propagate the textual and structural changes of a particular node in dialog change 144 across multiple nodes of conversational agent 124, prior to updating conversational agent with the proposed additional changes. In one example, in response to updating and testing conversational agent, source control service 132 returns test results 146 indicating a response to the updated conversational agent to testing.

In one embodiment of the present invention, dialog change controller 130 manages evaluation and propagation of dialog change 144 across a single conversational agent to which dialog change 144 is directed. In another embodiment of the present invention, for each dialog change directed to one of the conversational agents stored with source control service 132, dialog change controller 130 manages evaluation and propagation of dialog change 144 across a selection of multiple separate conversational agents stored by source control service 132.

In one embodiment of the present invention, the functionality of dialog change controller 130 is additionally or alternatively implemented by configuration assistant service 104. In one example, configuration assistant service 104 directly manages changes to conversational agent 124 in response to dialog change 144 as directed by dialog change controller 130, independent of any source control service interface and independent of whether or not an instance of conversational agent 124 is stored with source control service 132. In another example, configuration assistant service 104 directly manages changes to conversational agent 124 in response to dialog change 144 as directed by dialog change controller 130 and then directs storage of an updated version of conversational agent 124 with source control service 132. In another example, configuration assistant service 104 submits changes determined by dialog change controller 130, in response to dialog change 144, to source control service 132, for source control service 132 to manage as changes to conversational agent 124.

Figure 2:
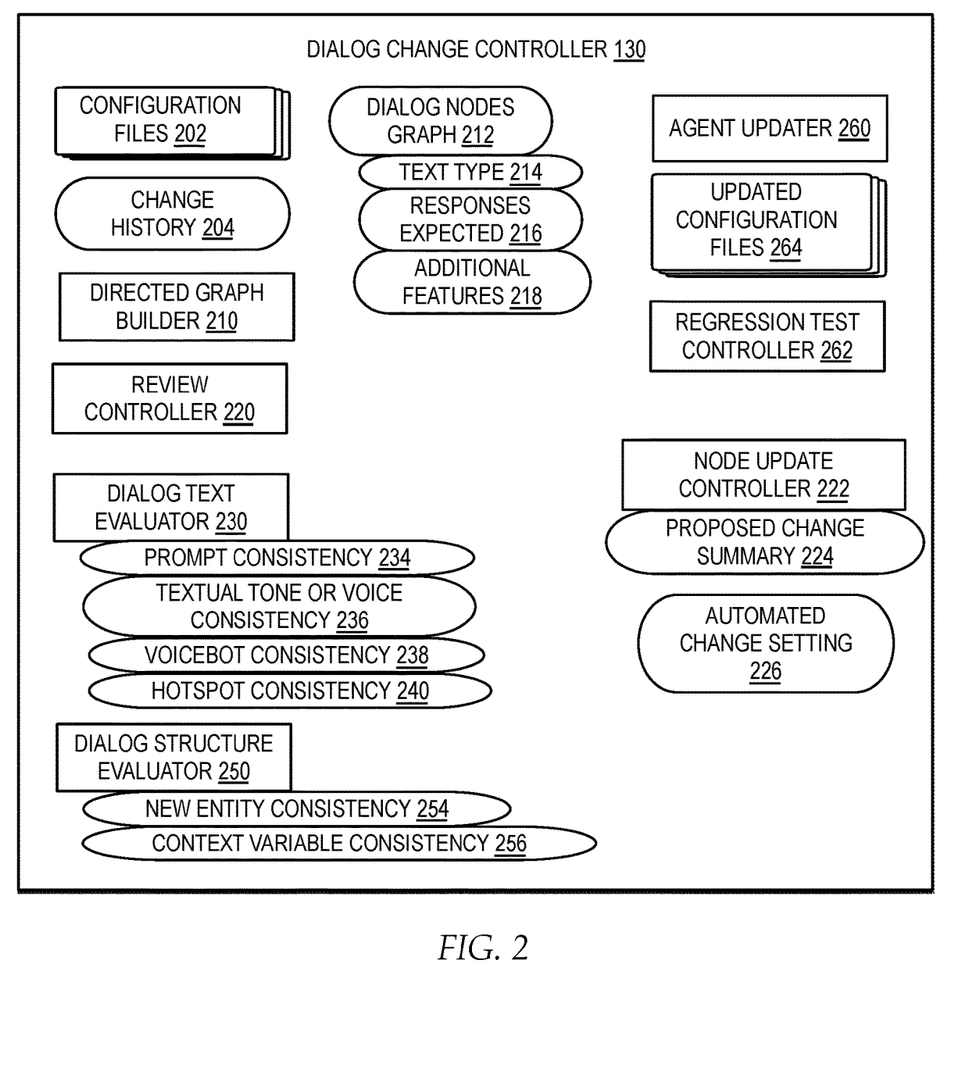
FIG. 2 illustrates one example of a block diagram of a dialog change controller of a source control service for efficiently managing predictive changes in response to a request for a dialog change to a conversational agent.

FIG. 2 illustrates one example of a block diagram of a dialog change controller of a source control service for efficiently managing predictive changes in response to a request for a dialog change to a conversational agent.

In one example, dialog change controller 130 manages evaluation and propagation of dialog changes requested in dialog change 144 to a current version of one or more configuration files 202 for conversational agent 124. In one example, conversational agent 124, includes configuration files 202 in a format configurable by configuration assistant service 104. In another example, conversational agent 124, including configuration files 202, are stored in source control by exporting a file representing dialog configured using a conversational agent configuration assistant for storage by source control service 132. For example, if a Watson Assistant is used as configuration assistant service 104 for configuring the dialog of conversational agent 124, then a developer selects to export the configured dialog as a JavaScript Object Notation (JSON) for storage by source control service 132. In one example, each configuration file in configuration files 202 describes a separate node.

In the example, dialog change controller 130 applies a directed graph builder 210 to build a dialog nodes graph 212 with a directed graph of dialog nodes from the code describing each node in configuration files 202. In the example, dialog nodes graph 212 may include a vertice for each dialog node, and links to other connected nodes, where edges are directed from one vertice to another vertice. In the example, each vertice of multiple vertices within dialog nodes graph 212 includes information about the features of the associated dialog node. For example, the features of the associated dialog node may include, but are not limited to, a text type 214, responses expected 216, and additional features 218. In one example, text type 214 may include one or more of whether text is a statement or question, whether text is in passive or active voice, and speech synthesis markup language (SSML) tags. In one example, responses expected 216 may include one or more of intent, entities, and context variables in connected nodes. In one example, additional features 218 may include one or more of conditional logic, context variables, action, confidence thresholds, and integration information, such as other models and APIs called.

In the example, dialog change controller 130 includes a review controller 220, which monitors for dialog change requests within dialog change 144. In response to review controller 220 detecting a dialog change request, review controller 220 triggers a dialog text evaluator 230 and a dialog structure evaluator 250.

In the example, dialog text evaluator 230 evaluates whether dialog change 144 is a dialog wording change. If dialog text evaluator 230 detects that dialog change 144 is a dialog wording change, dialog text evaluator 230 evaluates which nodes require a similar wording change based on structure and textual context. In one example, dialog text evaluator 230 may evaluate setting one or more of prompt consistency 234, textual tone or voice consistency 236, voicebot consistency 238, and hotspot consistency 240 in evaluating which nodes require a similar wording change based on structure and textual context. If dialog text evaluator 230 detects a selection of one or more other nodes that require similar wording changes to the change requested in dialog change 144, dialog text evaluator 230 highlights the selection of other nodes that require similar wording changes for review by a node update controller 222.

In one example, dialog text evaluator 230 evaluates whether to highlight prompt consistency 234 for each node by evaluating a prompt from an expected response in an initial prompt for a wording change in dialog change 144. Dialog text evaluator 230 marks prompt consistency 234 in each node with same or similar response sets in responses expected 216 and related textual analysis to the selected node in dialog change 144. For example, a dialog change 144 may request a change to a selected node set with a dialog response of "would you like me to repeat that?" with expected responses of "yes" or "no" by a user, to a dialog response of "Yes or no, would you like me to repeat that?" In the example, dialog text evaluator 230 evaluates a selection of nodes with expected responses of "yes" or "no" and sets prompt consistency 234 to update the dialog response for each of the selection of nodes with the new text in dialog change 144 of "yes or no" preceding the current dialog text.

In one example, dialog text evaluator 230 evaluates whether to highlight textual tone or voice consistency 236 for each node by evaluating whether any changes in tone or changes between active and passive voice for a wording change in dialog change 144. Dialog text evaluator 230 marks textual tone or voice consistency 236 in each node with a same or similar tone or voice attribute in text type 214 to the initial words in the selected node in dialog change 144, which are changed by the dialog change 144. For example, if dialog change 144 changes word in a selected node from passive voice to active voice, dialog text evaluator 230 evaluates the dialog in other nodes for text that is in a passive voice and marks textual tone or voice consistency 236 in a selection of nodes identified with text in a passive voice to be updated to active voice. Dialog text evaluator 230 may apply one or more types of classifiers and models trained to identify and convert active, interrogative text into passive, passive text into active text, and one tone into another tone.

In one example, dialog text evaluator 230 evaluates whether to highlight voicebot consistency 238 for each node by evaluating whether the speech playback parameters of a type of node in text type 214 are changed for the selected node in dialog change 144. In the example, dialog text evaluator 230 marks voicebot consistency 238 in each node with similar speech playback parameter adjustments to the speech playback parameter change in the selected node in dialog change 144. For example, based on a speech playback parameter change for a type of node in dialog change 144, dialog text evaluator 230 may mark voicebot consistency 238 for all nodes asking a question to increase playback speed by 25% and mark voicebot consistency 238 for all nodes making a statement to decrease playback speed by 10%. In another example, dialog text evaluator 230 may evaluate keeping a language model (LM) consistent, where if a new or different LM is applied to a selected node in dialog change 144, disk text evaluator 230 identifies a selection of other nodes with similar context and that accept similar types of input as the selected node and marks the selection of other nodes for updating to reflect the new or different LM. In another example, dialog text evaluator 230 may evaluate whether a word or phrase uses a new SSML tag in dialog change 144, identify a selection of other nodes with a same word or phrase, and mark the selection of nodes for updating the same word or phrase to propagate the new SSML tag change.

In one example, dialog text evaluator 230 evaluates whether to highlight hotspot consistency 240 for each node by evaluating a change history 204 of complete files to detect which nodes frequently change in tandem with changes to the selected node in dialog change 144 despite no other obvious connection to the selected node. In one example, as source control service 132 confirms changes to configuration files 202, source control service 132 updates change history 204 with the changes. In the example, dialog text evaluator 230 identifies the selection of other nodes that frequently change in tandem with the selected node in dialog change 144 and marks hotspot consistency 240 for the selected other nodes to identify the selection of nodes as needing changes. In one example, to support evaluation by dialog text evaluator 230 of hotspot consistency, source control service 132 may support storage of conversational agent 124 using a "one node per file" strategy that supports hotspot analysis by a behavioral code analysis service, such as, but not limited to, CodeScene (CodeScene is a registered trademark of Empear).

In the example, dialog structure evaluator 250 evaluates whether dialog change 144 is a dialog structure change. If dialog structure evaluator 250 detects that dialog change 144 is a dialog structure change, dialog structure evaluator 250 evaluates which nodes in additional features 218 require a similar structure change based on structure and textual context. In one example, dialog structure evaluator 250 may evaluate setting one or more of new entity consistency 254 and context variable consistency 256 in evaluating which nodes require a similar structure change based on structure and textual context. If dialog structure evaluator 250 detects a selection of one or more other nodes that require similar structure changes to the change requested in dialog change 144, dialog structure evaluator 250 highlights the selection of other nodes that require similar structure changes for review by a node update controller 222.

In one example, dialog structure evaluator 250 evaluates whether to highlight new entity consistency 254 for each node by evaluating whether a new intent or entity is added to a response set of a selected node through dialog change 144. If dialog structure evaluator 250 identifies that a new intent or entity is added to a response set in responses expected 216 or additional features 218 of a selected node through dialog change 144, dialog structure evaluator 250 determines a selection of other nodes with another response set that a superset of the changed response set and sets new entity consistency 254 for the selection of other nodes to add the new intent or entity with placeholder text in the selection of other nodes.

In one example of dialog structure evaluator 250, if dialog change 144 updates a "@yes/@no" prompt in a selected node to "@yes/@noi@i_dont_know", then dialog structure evaluator 250 marks new entity consistency 254 for the selection of other nodes already expecting "@yes/@no" with the new text of "@i_dont_know".

In another example of dialog structure evaluator 250, if conversational agent 124 supports slots, then if dialog change 144 updates a prompt in a selected node for one slot, then dialog structure evaluator 250 marks new entity consistency 254 for any other selected slots that would support the new text. For example, if conversational agent 124 supports a service for booking a trip, where the information of a "destination", "departure date", and "return date" are defined as the three slots to fill, conversational agent 124 may be configured with multiple followup questions if an input requests to book a trip but does not provide all the information needed to fill each slot. In the example, if dialog change 144 adds an additional feature in a follow-up question for the "departure date" slot, then dialog structure evaluator 250 marks new entity consistency 254 for the selection of other slots that share similar structure characteristics, such as the "return date" slot.

In another example of dialog structure evaluator 250, if conversational agent 124 supports digressions, then if dialog change 144 updates a digression node to which a conversation is directed if a user opts out of a current dialog progression, then dialog structure evaluator 250 marks new entity consistency 254 for any other digression nodes. For example, conversational agent 124 may be coded to respond to any response by a user that indicates the user is opting out of the current dialog progression by triggering a digression node specified for selecting a next response that does not continue the same dialog progression. In one example, a single dialog node may be coded to provide a single point for all conversations to change paths, however, in another example, each node may be individually coded to digress to a separate digression node from among multiple similar digression nodes.

In one example, dialog structure evaluator 250 evaluates whether to highlight context variable consistency 256 for each node by evaluating whether a context variable is added in a branch that already considers one or more context variables by the change in dialog change 144. In the example, if dialog structure evaluator 250 evaluates in additional features 218 that a context variable is added in a branch that already considers one or more context variables by the change in dialog change 144, then dialog structure evaluator 250 identifies a selection of one or more other nodes with additional features 218 that reference the same one or more context variables and sets context variable consistency 256 for the selection of one or more other nodes to add a placeholder node for the context variable.

In the example, node update controller 222 collects the highlighted nodes by dialog text evaluator 230 and dialog structure evaluator 250 and builds a proposed change summary 224 reflecting the proposed changes. In one example, node update controller 222 builds proposed change summary 224 through a pull request that pulls all the highlighted changes set by node by dialog text evaluator 230 and dialog structure evaluator 250 into a tree structure or other change evaluation structure that allows system user 140 and other collaborators to manually review and approve each proposed change, before the changes are merged into conversational agent 124. In addition, node update controller 222 may select to automatically apply one or more of the proposed changes in proposed change summary 224 based on a selection of an automated change setting 226. In one example, automated change setting 226 may be set for one or more types of automated updating including, but not limited to, automatically direct updating of all changes in proposed change summary 224, require manual review of all proposed changes in proposed change summary 224, and selectively determine whether to automate update one or more changes or require manual review based on one or more conditions.

In one example, after node update controller 222 approves the changes from proposed change summary 224, an agent updater 260 of dialog change controller 130 commits the changes to code to a new version of configuration files 202, illustrated as updated configuration files 264, records the updated changes in change history 204, and stores updated configuration files 264 for conversational agent 124 with source control service 132. In one example, where configuration assistant service 104 provides the service dialog change controller 130, configuration assistant service 104 may directly update configuration files 202 of conversational agent 124. Dialog change controller 130 implements a regression test controller 262 to run regression tests on the updated conversational agent. In the example, regression test controller 262 returns test results 146 to development interface 122. In the example, if regression test controller 262 detects a failure, regression test controller 262 generates a problem ticket with proposed change summary 224 in test results 146, for access by system user 140 or an automated service, to evaluate additional dialog changes to correct the detected failure.

Figure 3:
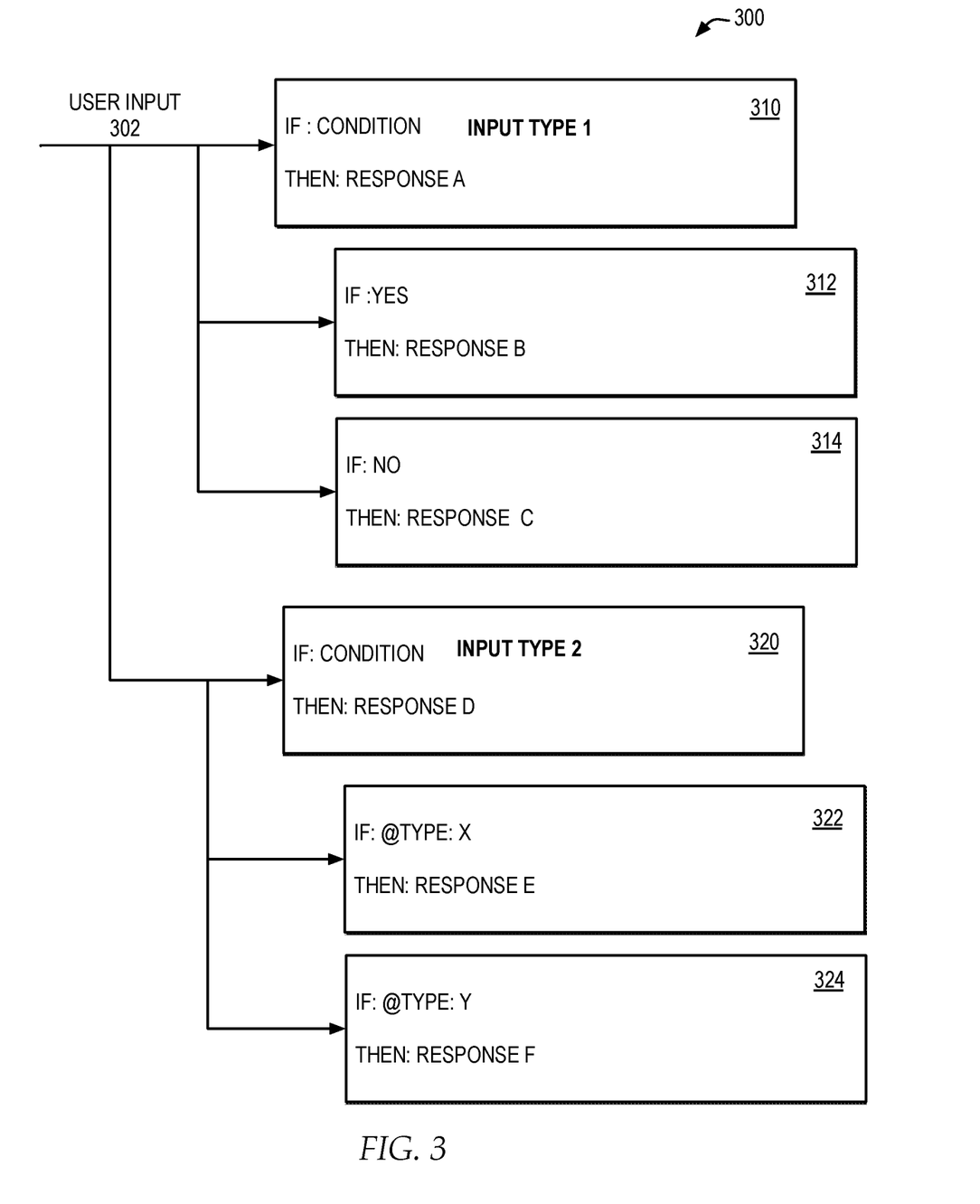
FIG. 3 illustrates one example of a block diagram of a graphical representation of a selection of dialog nodes organized in a tree structure, as configured in a conversational agent.

FIG. 3 illustrates one example of a block diagram of a graphical representation of a selection of dialog nodes organized in a tree structure, as configured in a conversational agent.

In one example, a tree 300 illustrates a graphical representation of a selection of dialog nodes of a conversational agent organized in a tree structure. In one example, tree 300 includes multiple dialog nodes, illustrated by a dialog node 310, a dialog node 312, a dialog node 314, a dialog node 320, a dialog node 322, and a dialog node 324. In one example, tree 300 is connected to a root node, which supports multiple tree structures, each configured for supporting a different conversational topic.

In the example, each dialog node in tree 300 includes at least a condition and a response. In one example, each condition specifies information that, if present in user input 302, triggers the dialog node. The information in each condition may include one or more of an intent, an entity type, and entity value, a context variable value, or other feature.

In one example, each response specifies the text or other utterance that is returned in a response to a user. The response may be configured one or more types of outputs including, but not limited to, a text string, an image, a list of options, or other programmatic actions. The response may be configured with additional context variable values. In the example, the response for each dialog node may also set the types of responses allowed and the types of movement when traversing tree 300. For example, if a response includes a setting of "return allowed", then during traversal if the end of a branch is reached or there is not a condition evaluated as true, conversational agent 124 jumps back out to the base of the tree returns to continue traversing the tree, and if a response includes a setting of "jump to", then during traversal, conversational agent jumps to a particular node specified in the "jump to" setting.

In the example, in response to user input 302, conversational agent 124 processes a dialog supported by tree 300 downward, from a first node to a last node. In one example, as conversational agent 124 traverses down tree 300, if user input 302 meets a condition in a dialog node, then conversational agent 124 triggers that dialog node and moves to check user input 302 against any child node conditions. As conversational agent 124 checks child node conditions, conversational agent 124 moves from the first child node to the last, until it reaches the last node in the branch it is following.

For example, conversational agent 124 processes a dialog supported by tree 300, in response to user input 302, by traversing a first parent dialog node 310, which if a condition for an "input type 1" is true, then traverses a child dialog node 312 and then a child dialog node 314. In addition, conversational agent 124 traverses a second parent dialog node 320, which if a condition for "input type 2" is true, then traverses a child dialog node 322 and then a child dialog node 324.

In the example, dialog change 144 may include a change request for changing a particular feature of a particular node from among tree 300. Dialog change controller 130 generates a directed graph of the code describing each of the nodes of tree 300 and then evaluates propagation of the change in dialog change 144 among all the nodes of tree 300 in view of the directed graph of the nodes and based on text and structure changes proposed, to maintain consistency. According to an advantage of the present invention, by dialog change controller 130 providing both an textual and structural evaluation of the change request in dialog change 144, dialog change controller 130 proposes additional sections of dialog and structure within dialog-based nodes structured in tree 300 to maintain consistency across the full range of node features, including, but not limited to, consistency of textual and grammatical structure, voice, tone, and expected responses.

Figure 4:
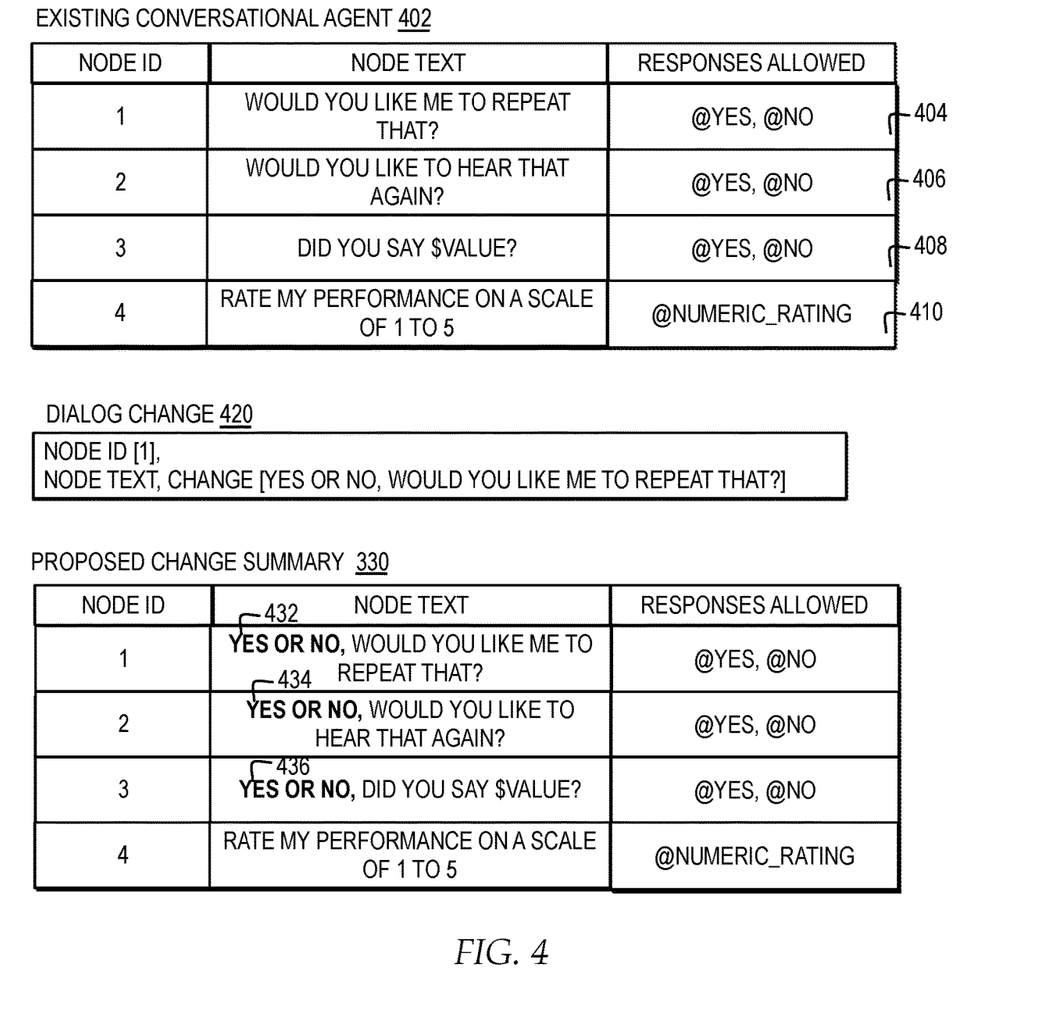
FIG. 4 illustrates one example of a block diagram of a predictive change response by a dialog change controller for a source control to maintain prompt consistency in response to a request for a textual dialog change in a conversational system.

FIG. 4 illustrates a block diagram of one illustrative example of a predictive change response by a dialog change controller for a source control to maintain prompt consistency in response to a request for a textual dialog change in a conversational system.

In the example, an existing conversational agent 402 is illustrated with an example of four nodes configured for the existing conversational agent, each identified by a node ID, node text, and responses allowed. In the example, conversational agent 402 includes: a node ID "1", node text "Would you like me to repeat that?", and responses allowed "@yes, @no", as illustrated at reference numeral 404; a node ID "2", node text "Would you like to hear that again?", and responses allowed "@yes,@no", as illustrated at reference numeral 406; a node ID "3", node text "Did you say $value?", and responses allowed "@yes,@no", as illustrated at reference numeral 408; and a node ID "4", node text "Rate my performance on a scale of 1 to 5?", and responses allowed "@numeric_rating", as illustrated at reference numeral 410.

In the example, dialog change controller 130 detects a dialog change 420, requesting a change to the node with node ID "1" and changing the node text to "yes or no, would you like me to repeat that?" In the example, directed graph builder 210 builds a directed graph of the code describing each of the nodes with node ID "1", node ID "2", node ID "3", and node ID 4". Review controller 220 evaluates the type of change requested in node text "yes or no, would you like me to repeat that?" and identifies a dialog type of "question" and change of wording of inserting "yes or no" into the node text in node ID "1".

In the example, review controller 220 triggers dialog text evaluator 230 to evaluate one or more proposed changes to other nodes in existing conversational agent 402 based on the text change of inserting "yes or no" into the node text of a dialog type of "question" in node ID "1". In one example, dialog text evaluator 230 detects that the proposed text change for a dialog type of "question" is associated with a response set of "@yes/@no" in node ID "1" and marks prompt consistency 234 for node ID "2 and node ID "3", based on identifying the same dialog type of "question" and the same response sets of "@yes/@no" in node ID "2" and node ID "3". In the example, node update controller 222 generates a proposed change summary 430 that proposes an insertion of "yes or no" in node ID "1" per dialog change 320, as illustrated at reference numeral 432, and also proposes an insertion of "yes or no" in node ID "2" and node ID "3" per evaluation of changes to maintain contextual consistency by dialog change controller 130, as illustrated at reference numerals 434 and 436, respectively.

In the example in FIG. 4, according to an advantage of the present invention, the contextual replacement performed by dialog change controller 130 for maintaining consistency within the dialog text of a conversational agent efficiently and accurately identifies that the change in node ID "1" should be propagated to both node ID "2" and node ID "3" based on the same dialog types and response sets. In the example, while the node text in node ID "2" has similar attributes to the node text in node ID "1" that might be identified by a native search and replace function, the node text in node ID "3" is not similar to the node text in node ID "1" and a native search and replace function alone would not identify that node ID "3" should also be changed to reflect the update in dialog change 420 to maintain consistency.

FIG. 5 illustrates a block diagram of one illustrative example of a predictive change response by a change controller for a source control to maintain context variable consistency in response to a request for a structural dialog change in a conversational system.

In the example, an existing conversational agent 502 is illustrated with an example of five nodes configured for the existing conversational agent, each identified by a node ID, node text, responses allowed, and dialog node context variable and value. In the example, existing conversational agent 502 includes a node ID "1", node text "May I have the date of service?", responses allowed "@date" and @yes, @no", a variable of "config" and a value of {"custom_id": "$DOS_MODEL", "max_a": 2, "acoustic_custom_id":

"$DATE_ACOUSTIC_MODEL"}, as illustrated at reference numeral 504. In addition, in the example, existing conversational agent 502 includes a node ID "2", node text "What's the date of service?", responses allowed "@date" and @yes,@no", a variable of "config" and a value of {"custom_id": "$DOS_MODEL", "max_a": 2, "acoustic_custom_id": "$DATE_ACOUSTIC_MODEL"}, as illustrated at reference numeral 406. In addition, in the example, existing conversational agent 502 includes a node ID "3", node text "May I have the date of birth?", responses allowed "@date" and @yes,@no", a variable of "config" and a value of {"custom_id": "$DOB_MODEL", "max_a": 2, "acoustic_custom_id": "$DATE_ACOUSTIC_MODEL"}, as illustrated at reference numeral 508. In addition, in the example, existing conversational agent 502 includes a node ID "4", node text "I did not understand, please repeat that?", responses allowed "@date" and @yes,@no", a variable of "config" and a value of {"custom_id": "$RETRY_1_MODEL", "max_a": 2, "acoustic_custom_id": "$DATE_ACOUSTIC_MODEL"}, as illustrated at reference numeral 510. In addition, in the example, existing conversational agent 502 includes a node ID "5", node text "How many times have you called us before?", responses allowed "@number", a variable of "config" and a value of {"custom_id": "$INTEGER_MODEL", "max_a": 2, "acoustic_custom_id": "$INTEGER_ACOUSTIC_MODEL"}, as illustrated at reference numeral 512. In the example, the "custom_ID" reflects a value setting for a customization ID, the "max_A" reflects a value setting for a maximum number of alternatives, and the "acoustic_custom_ID" reflects a value setting for an acoustic customization ID. In additional or alternate examples, additional or alternate types of context variables and values may be set for each node.

In the example, dialog change controller 130 detects a dialog change 520, requesting a change to the node with node ID "1" and changing the variable and value to "variable: CONFIG" AND "value {"custom_id": "$DATE_OPT_MODEL", "max_a": 2, "acoustic_custom_id": "$DATE_ACOUSTIC_MODEL"}. In the example, directed graph builder 210 builds a directed graph of the coding describing each of the nodes with node ID "1", node ID "2", node ID "3", node ID 4", and node ID "5". Review controller 220 evaluates the type of change requested in the context variable of updating values for node ID "1" to replace the "custom_ID" from "$DOS_MODEL" to "$DATE_OPT_MODEL".

In the example, review controller 220 triggers dialog structure evaluator 250 to evaluate one or more proposed changes to other nodes in existing conversational agent 502 based on the structure change of changing the value for "custom_ID" for a node with the allowed responses of "@date" and "@yes,@no" and the same "acoustic_custom_ID" of "$DATE_ACOUSTIC_MODEL" in node ID "1". In one example, dialog structure evaluator 250 detects that the proposed value structure change for a node with allowed responses of "@date" and "@yes,@no" and the same "acoustic_custom_ID" of "$DATE_ACOUSTIC_MODEL", and marks context variable consistency 256 for node ID "2", node ID "3", and node ID "4", based on identifying the same responses sets of "@date" and "@yes, @no" in node ID "2", node ID "3", and node ID "4". In the example, even though node ID "3" and node ID "4" have different a "custom_ID" from node ID "1", the common features of response set value and "acoustic_custom_ID" value trigger dialog structure evaluator 250 to identify node ID "3" and node ID "4" for propagation of the same structure change as node ID "1". In the example, node update controller 222 generates a proposed change summary 530 that proposes replacing the "custom_ID" with "$DATE_OPT_MODEL" in node ID "1" per dialog change 420, as illustrated at reference numeral 432, and also proposes replacing the "custom_ID" with "$DATE_OPT_MODEL" in node ID "2", node ID "3", and node ID "4", per evaluation of changes to maintain contextual consistency by dialog change controller 130, as illustrated at reference numerals 534, 536, and 538, respectively.

In the example in FIG. 5, according to an advantage of the present invention, the contextual replacement performed by dialog change controller 130 for maintaining consistency within the dialog node context values of a conversational agent efficiently and accurately identifies that the change in node ID "1" should be propagated to node ID "2", node ID "3", and node ID "4" based on the same response sets and same "acoustic_custom_ID". In the example, while the value setting of "custom_ID" in node ID "2" is the same as the value setting of "custom_ID" in node ID "1" that might be identified by a native search and replace function, the value setting of "custom_ID" in node ID "3" and node ID "4" is not the same as the value setting of "custom_ID" in node ID "1" and a native search and replace function alone would not identify that node ID "3" or node ID "4" should also be changed to reflect the update in dialog change 520 to maintain consistency.

Figure 6:
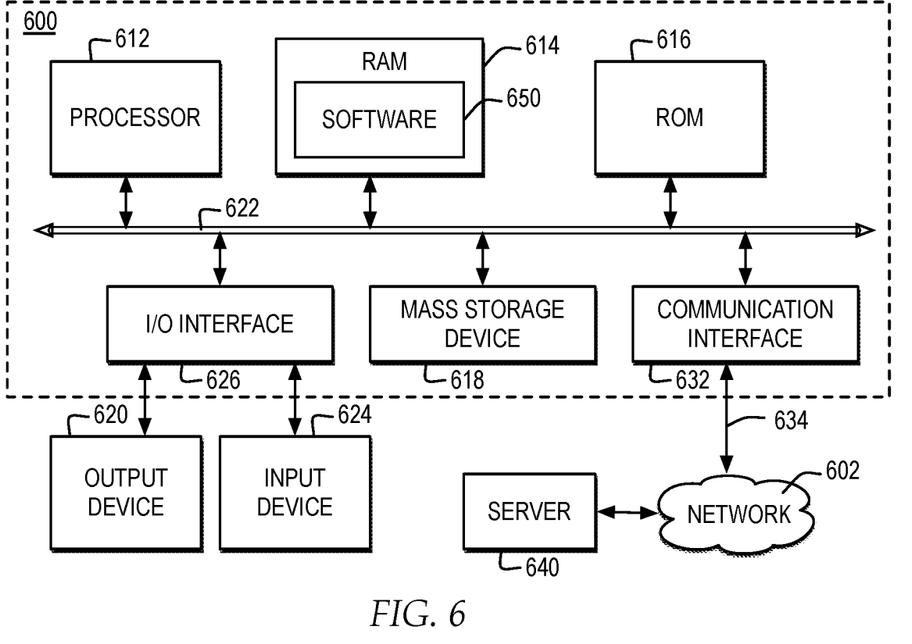
FIG. 6 illustrates one example of a computer system in which one embodiment of the invention may be implemented.

FIG. 6 illustrates a block diagram of one example of a computer system in which one embodiment of the invention may be implemented. The present invention may be performed in a variety of systems and combinations of systems, made up of functional components, such as the functional components described with reference to a computer system 600 and may be communicatively connected to a network, such as network 602.

Computer system 600 includes a bus 622 or other communication device for communicating information within computer system 600, and at least one hardware processing device, such as processor 612, coupled to bus 622 for processing information. Bus 622 preferably includes low-latency and higher latency paths that are connected by bridges and adapters and controlled within computer system 600 by multiple bus controllers. When implemented as a server or node, computer system 600 may include multiple processors designed to improve network servicing power.

Processor 612 may be at least one general-purpose processor that, during normal operation, processes data under the control of software 650, which may include at least one of application software, an operating system, middleware, and other code and computer executable programs accessible from a dynamic storage device such as random access memory (RAM) 614, a static storage device such as Read Only Memory (ROM) 616, a data storage device, such as mass storage device 618, or other data storage medium. Software 650 may include, but is not limited to, code, applications, protocols, interfaces, and processes for controlling one or more systems within a network including, but not limited to, an adapter, a switch, a server, a cluster system, and a grid environment.

Computer system 600 may communicate with a remote computer, such as server 640, or a remote client. In one example, server 640 may be connected to computer system 600 through any type of network, such as network 602, through a communication interface, such as network interface 632, or over a network link that may be connected, for example, to network 602.

In the example, multiple systems within a network environment may be communicatively connected via network 602, which is the medium used to provide communications links between various devices and computer systems communicatively connected. Network 602 may include permanent connections such as wire or fiber optics cables and temporary connections made through telephone connections and wireless transmission connections, for example, and may include routers, switches, gateways and other hardware to enable a communication channel between the systems connected via network 602. Network 602 may represent one or more of packet-switching based networks, telephony-based networks, broadcast television networks, local area and wire area networks, public networks, and restricted networks.

Network 602 and the systems communicatively connected to computer 600 via network 602 may implement one or more layers of one or more types of network protocol stacks which may include one or more of a physical layer, a link layer, a network layer, a transport layer, a presentation layer, and an application layer. For example, network 602 may implement one or more of the Transmission Control Protocol/Internet Protocol (TCP/IP) protocol stack or an Open Systems Interconnection (OSI) protocol stack. In addition, for example, network 602 may represent the worldwide collection of networks and gateways that use the TCP/IP suite of protocols to communicate with one another. Network 602 may implement a secure HTTP protocol layer or other security protocol for securing communications between systems.

In the example, network interface 632 includes an adapter 634 for connecting computer system 600 to network 602 through a link and for communicatively connecting computer system 600 to server 640 or other computing systems via network 602. Although not depicted, network interface 632 may include additional software, such as device drivers, additional hardware and other controllers that enable communication. When implemented as a server, computer system 600 may include multiple communication interfaces accessible via multiple peripheral component interconnect (PCI) bus bridges connected to an input/output controller, for example. In this manner, computer system 600 allows connections to multiple clients via multiple separate ports and each port may also support multiple connections to multiple clients.

Figure 7:
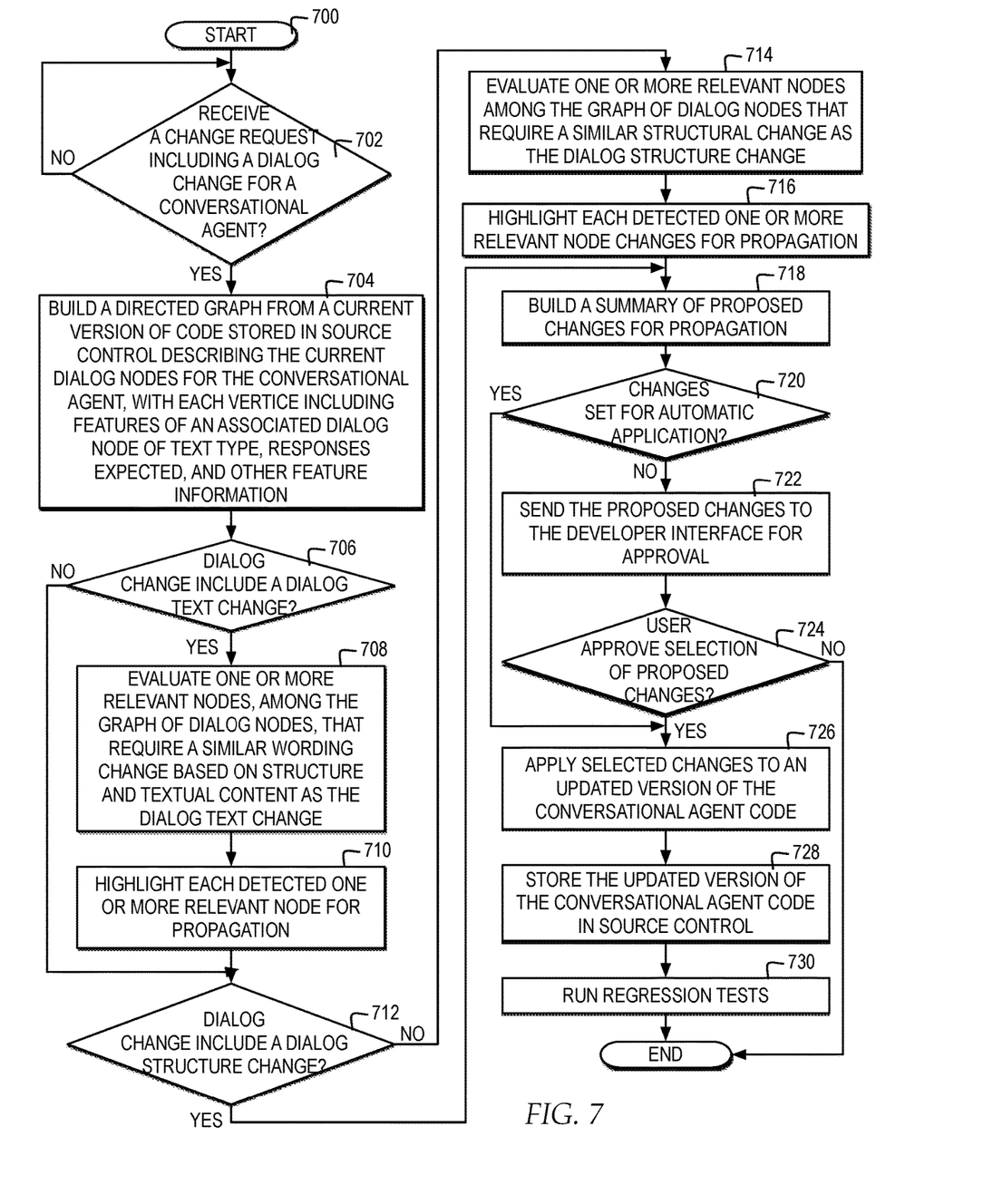
FIG. 7 illustrates a high-level logic flowchart of a process and computer program for efficiently managing predictive changes in response to a request for a dialog change in a conversational agent.

In one embodiment, the operations performed by processor 612 may control the operations of flowchart of FIG. 7 and other operations described herein. Operations performed by processor 612 may be requested by software 650 or other code or the steps of one embodiment of the invention might be performed by specific hardware components that contain hardwired logic for performing the steps, or by any combination of programmed computer components and custom hardware components. In one embodiment, one or more components of computer system 600, or other components, which may be integrated into one or more components of computer system 600, may contain hardwired logic for performing the operations of flowchart in FIG. 7.

In addition, computer system 600 may include multiple peripheral components that facilitate input and output. These peripheral components are connected to multiple controllers, adapters, and expansion slots, such as input/output (I/O) interface 626, coupled to one of the multiple levels of bus 622. For example, input device 624 may include, for example, a microphone, a video capture device, an image scanning system, a keyboard, a mouse, or other input peripheral device, communicatively enabled on bus 622 via I/O interface 626 controlling inputs. In addition, for example, output device 620 communicatively enabled on bus 622 via I/O interface 626 for controlling outputs may include, for example, one or more graphical display devices, audio speakers, and tactile detectable output interfaces, but may also include other output interfaces. In alternate embodiments of the present invention, additional or alternate input and output peripheral components may be added.

With respect to FIG. 6, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Those of ordinary skill in the art will appreciate that the hardware depicted in FIG. 6 may vary. Furthermore, those of ordinary skill in the art will appreciate that the depicted example is not meant to imply architectural limitations with respect to the present invention.

FIG. 7 illustrates a high-level logic flowchart of a process and computer program for efficiently managing predictive changes in response to a request for a dialog change in a conversational agent.

In one example, the process and computer program starts at block 700 and thereafter proceeds to block 702. Block 702 illustrates receiving a change request including a dialog change for a conversational agent. At block 702, if a change request including a dialog change for a conversational agent is received, then the process passes to block 704. Block 704 illustrates building a directed graph from a current version of code, such as multiple configuration files, stored in source control describing each of the current dialog nodes for the conversational agent, with each vertex including features of an associated a dialogue node of text type, responses expected, and other feature information, and the process passes to block 706.

Block 706 illustrates a determination whether a dialog change includes a dialog text change. At block 706, if a dialog change does not include a dialog text change, then the process passes to block 712. Otherwise, at block 706, if a dialog change includes a dialog text change, then the process passes to block 708. Block 708 illustrates evaluating one or more relevant nodes, among the graph of dialog nodes, that require a similar wording change based on structure and textual content as the dialog text change. Next, block 710 illustrates highlighting each detected one or more relevant node for propagation, and the process passes to block 712.

Block 712 illustrates a determination whether a dialog change includes a dialog structure change. At block 712, if a dialog change does not include a dialog structure change, then the process passes to block 718. Otherwise, at block 712, if a dialog change includes a dialog structure change, then the process passes to block 714. Block 714 illustrates evaluating one or more relevant nodes, among the graph of dialog nodes, that require a similar structure change based on structure and textual content as the dialog structure change. Next, block 716 illustrates highlighting each detected one or more relevant node for propagation, and the process passes to block 718.

Block 718 illustrates building a summary of proposed changes for propagation. Next, block 720 illustrates a determination whether the changes are set for automatic application. At block 720, if the changes are set for automatic application, then the process passes to block 726. Otherwise, at block 720, if the changes are not set for automatic application, then the process passes to block 722. Block 722 illustrates sending the proposed changes to the developer interface for approval. Next, block 724 illustrates a determination whether the user approves a selection of proposed changes. At block 724, if the user does not approve a selection of proposed changes, then the process ends. Otherwise, at block 724, if the user does approve a selection of proposed changes, then the process passes to block 726.

Block 726 illustrates applying selected changes to an updated version of the conversational agent code, such as a selection of configuration files each identifying a separate node. Next, block 728 illustrates storing the updated version of the conversational agent code in source control Thereafter, block 730 illustrates running regression testing, and the process ends.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification specify the presence of stated features, integers, steps, operations, elements, and/or components, but not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the one or more embodiments of the invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the invention has been particularly shown and described with reference to one or more embodiments, it will be understood by those skilled in the art that various changes in form and detail may be made therein without departing from the spirit and scope of the invention.

What is claimed is:

1. A method, comprising:
    building, by a computer, a directed graph of a plurality of nodes each described by code for a conversational agent, the code comprising one or more dialog-based features, wherein each node of the plurality of nodes comprises the one or more dialog-based features comprising a text type and responses expected;
    responsive to receiving a dialog change to a first node of the plurality of nodes of the conversational agent, identifying, by the computer, at least one additional node from the plurality of nodes that have similar textual, structural content, and expected responses as the first node;
    updating, by the computer, the first node with the dialog change;
    propagating, by the computer, the at least one additional node with the dialog change to the first node, wherein the at least one additional node has similar textual, structural content, and expected responses as the first node.

2. The method according to claim 1, wherein each node of the plurality of nodes comprises one or more additional features comprising: conditional logic, context variables, action, confidence thresholds, and integration information.

3. The method according to claim 1, wherein, responsive to receiving the request for the dialog change to the particular node from among the plurality of nodes of the conversational agent, evaluating, by the computer, the directed graph to identify the additional selection of nodes from the among the plurality of nodes that have similar textual and structural content as the dialog change based on the textual and structural content, further comprises:
    responsive to the dialog change comprising a textual change, evaluating, by the computer, the directed graph to identify the additional selection of nodes from among the plurality of nodes that have similar textual and structural content as the first node as the textual change.

4. The method according to claim 3, further comprising:
    evaluating, by the computer, the directed graph to identify the selection of nodes that have similar textual and structural content as the textual change by evaluating one or more of a prompt consistency, a textual tone and voice consistency, a voicebot consistency, and a hotspot consistency.

5. The method according to claim 1, wherein, responsive to receiving the request for the dialog change to the particular node from among the plurality of nodes of the conversational agent, evaluating, by the computer, the directed graph to identify the additional selection of nodes from the among the plurality of nodes that have similar textual and structural content as the dialog change based on the textual and structural content, further comprises:
    responsive to the dialog change comprising a structural change, evaluating, by the computer, the directed graph to identify the additional selection of nodes from among the plurality of nodes that have similar textual and structural content as the structural change.

6. The method according to claim 5, further comprising:
    evaluating, by the computer, the directed graph to identify the selection of nodes that have similar textual and structural content as the structural change by evaluating one or more of new entity consistency and content variable consistency.

7. The method according to claim 1, wherein updating, by the computer, the code for the first node and the at least one additional node to propagate the dialog change in the conversational agent further comprises:
    sending, by the computer, a request from source control to a developer interface for a user to approve a respective proposed change for each of the first node and the at least one additional node to the conversational agent as stored by source control;
    responsive to receiving a user approval for the request, updating, by the computer, a selection of configuration files comprising the code for the first node and the at least one additional node with each respective proposed change from among the plurality of configuration files of the conversational agent; and
    storing, by the computer, an updated version of the conversational agent with the updated selection of configuration files, by the source control.

8. A computer system comprising one or more processors, one or more computer-readable memories, one or more computer-readable storage devices, and program instructions, stored on at least one of the one or more storage devices for execution by at least one of the one or more processors via at least one of the one or more memories, the stored program instructions comprising:
    program instructions to build a directed graph of a plurality of nodes each described by code for a conversational agent, the code comprising one or more dialog-based features, wherein each node of the plurality of nodes comprises the one or more dialog-based features comprising a text type and responses expected;
    program instructions, responsive to receiving a dialog change to a first node of the plurality of nodes of the conversational agent, to identify at least one additional node from the plurality of nodes that have similar textual, structural content, and expected responses as the first node;

program instructions to update for the first node with the dialog change; and program instructions to propagate the at least one additional node with the dialog change to the first node, wherein the at least one additional node has similar textual, structural content, and expected responses as the first node.

9. The computer system according to claim 8, wherein each node of the plurality of nodes comprises one or more additional features comprising: conditional logic, context variables, action, confidence thresholds, and integration information.

10. The computer system according to claim 8, wherein the program instructions, responsive to receiving the request for the dialog change to the particular node from among the plurality of nodes of the conversational agent, to evaluate the directed graph to identify the additional selection of nodes from the among the plurality of nodes that have similar textual and structural content as the dialog change based on the textual and structural content, further comprise:

program instructions, responsive to the dialog change comprising a textual change, to evaluate the directed graph to identify the additional selection of nodes from among the plurality of nodes that require the similar changes as the textual change.

11. The computer system according to claim 10, further comprising:

program instructions to evaluate the directed graph to identify the selection of nodes that have similar textual and structural content as the textual change by evaluating one or more of a prompt consistency, a textual tone and voice consistency, a voicebot consistency, and a hotspot consistency.

12. The computer system according to claim 8, wherein the program instructions, responsive to receiving the request for the dialog change to the particular node from among the plurality of nodes of the conversational agent, to evaluate the directed graph to identify the additional selection of nodes from the among the plurality of nodes that have similar textual and structural content as the dialog change based on the textual and structural content, further comprise:

program instructions, responsive to the dialog change comprising a structural change, to evaluate the directed graph to identify the additional selection of nodes from among the plurality of nodes that have similar textual and structural content as the structural change.

13. The computer system according to claim 12, further comprising:

program instructions to evaluate the directed graph to identify the selection of nodes that have similar textual and structural content as the structural change by evaluating one or more of new entity consistency and content variable consistency.

14. The computer system according to claim 8, wherein the program instructions to update the code for the first node and the at least one additional node to propagate the dialog change in the conversational agent further comprise:

program instructions to send a request from source control to a developer interface for a user to approve a respective proposed change for each of the first node and the at least one additional node to the conversational agent as stored by source control;

program instructions, responsive to receiving a user approval for the request, to update a selection of configuration files comprising the code for the first node and the at least one additional node with each respective proposed change from among the plurality of configuration files of the conversational agent; and program instructions to store an updated version of the conversational agent with the updated selection of configuration files, by the source control.

15. A computer program product comprises one or more computer readable storage media having program instructions collectively stored thereon, wherein the one or more computer readable storage media are not a transitory signal per se, the program instructions executable by a computer to cause the computer to:

build, by a computer, a directed graph of a plurality of nodes each described by code for a conversational agent, the code comprising one or more dialog-based features, wherein each node of the plurality of nodes comprises the one or more dialog-based features comprising a text type and responses expected;

responsive to receiving a dialog change to a first node of the plurality of nodes of the conversational agent, identify, by the computer, at least one additional node from the plurality of nodes that have similar textual, structural content, and expected responses as the first node;

update, by the computer, for the first node with the dialog change; and propagate, by the computer, the at least one additional node with the dialog change to the first node, wherein the at least one additional node has similar textual, structural content, and expected responses as the first node.

16. The computer program product according to claim 15, wherein each node of the plurality of nodes comprises one or more additional features comprising: conditional logic, context variables, action, confidence thresholds, and integration information.

17. The computer program product according to claim 15, further comprising the program instructions executable by a computer to cause the computer to:

responsive to the dialog change comprising a textual change, evaluate, by the computer, the directed graph to identify the additional selection of nodes from among the plurality of nodes that have similar textual and structural content as the textual change.

* * * * *